United States Patent [19]
Tarnopolsky

[11] Patent Number: 5,667,038
[45] Date of Patent: Sep. 16, 1997

[54] SYSTEM AND METHOD OF CONVERSION OF GRAVITATION IN THIS IMPULSE OF FORCE

[76] Inventor: Mikhail Tarnopolsky, 305 80th St. #c3, Brooklyn, N.Y. 11209

[21] Appl. No.: 489,784

[22] Filed: Jun. 13, 1995

[51] Int. Cl.$^6$ .................. F03G 3/00; B23B 45/16
[52] U.S. Cl. .................................... 185/27; 173/94
[58] Field of Search .................. 185/27, 32, 33; 74/84 R, 84 S, DIG. 9, 572; 173/94

[56] References Cited

U.S. PATENT DOCUMENTS 2,340,155  1/1944  Tanner ..................... 185/33 X
4,492,287  1/1985  Umehara .................. 185/33

FOREIGN PATENT DOCUMENTS 2914038  10/1980  Germany ................. 74/84 S
52-4952   1/1977   Japan ................... 74/DIG. 9
1547762   6/1979   United Kingdom ........ 74/84 S Primary Examiner—Allan D. Herrmann

[57] ABSTRACT

Two elements placing one into another and having different masses are connected with one another so that during one portion of their rotation they rotate jointly, and then when one of the elements reaches a break of its way the other element continues the same way rotation.

4 Claims, 6 Drawing Sheets

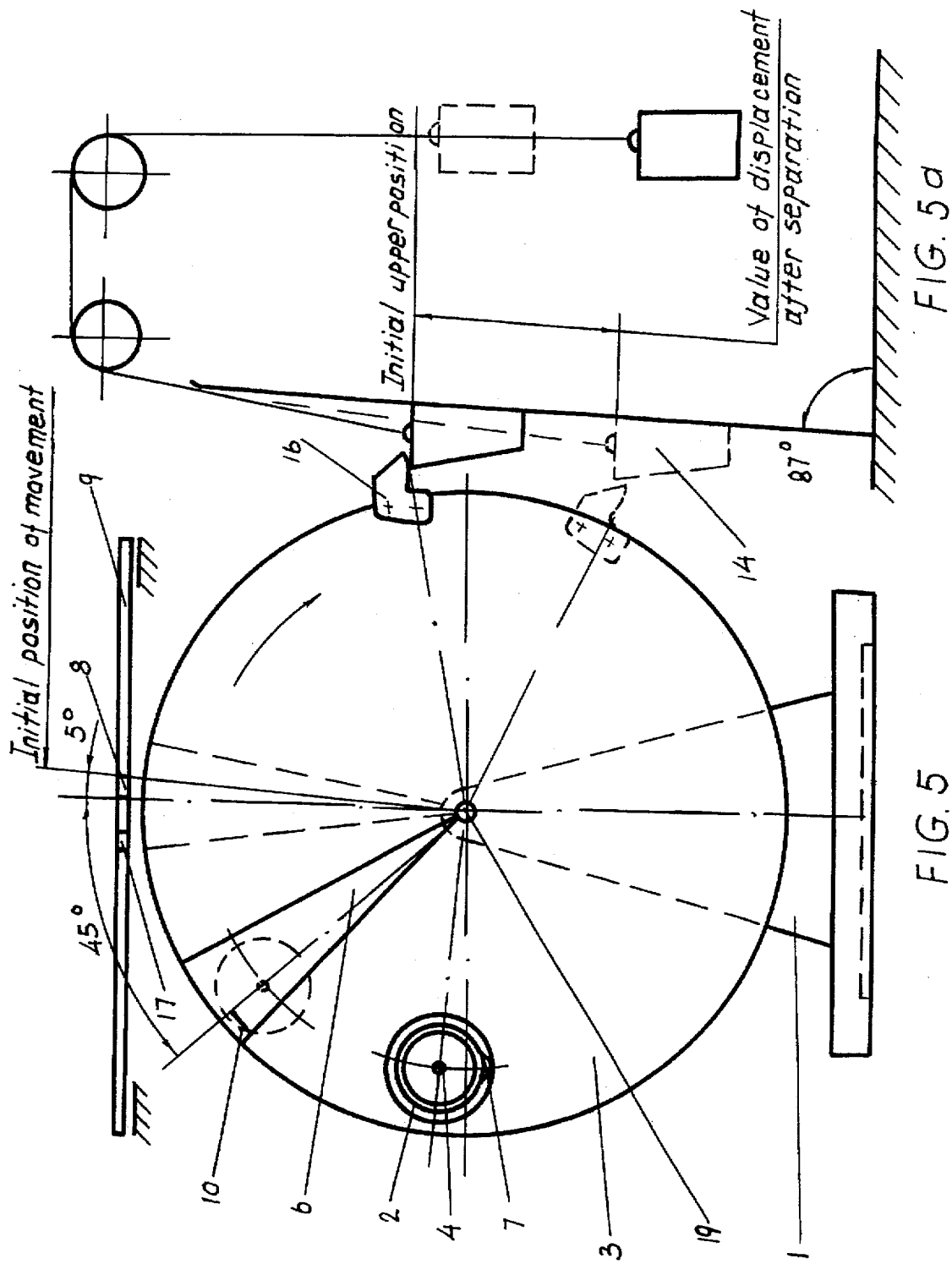

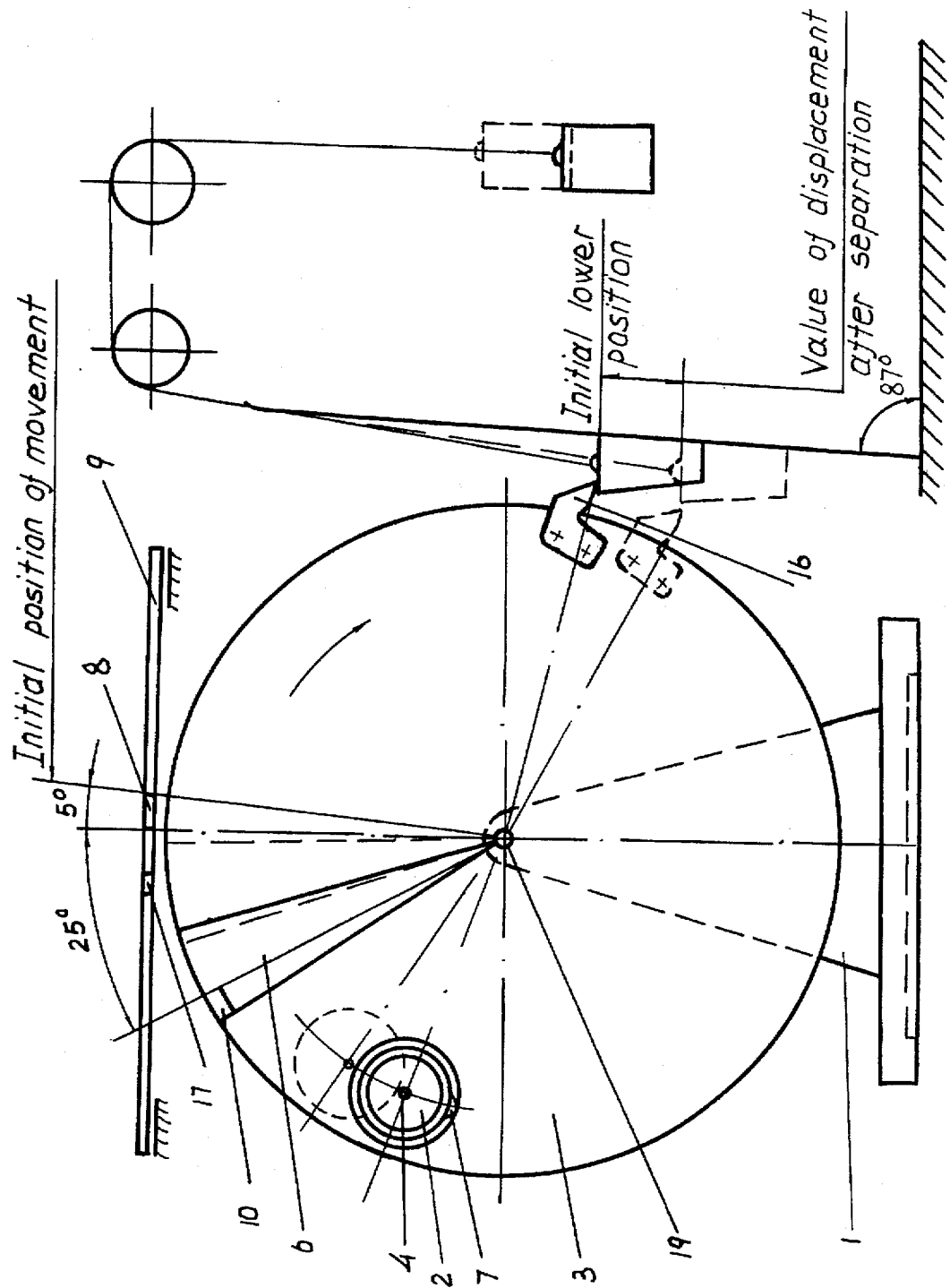

5,667,038

SYSTEM AND METHOD OF CONVERSION OF GRAVITATION IN THIS IMPULSE OF FORCE

BACKGROUND OF INVENTION

The present invention relates to a new way of getting clear energy, using mechanical system and gravitation.

It is well known that generation of energy is one of the most important tasks of modern industry, since energy is used in all aspects of peoples' lives, as well as in industrial and agricultural fields, etc.

It is therefore believed to be clear that it is advisable to propose further system and method of conversion of gravitation in the impulse of force which can be used for many applications.

SUMMARY OF THE INVENTION

Accordingly, it is an object of the present invention to provide a new system and method of conversion of gravitation in the impulse of force.

In keeping with these objects and with others which will become apparent hereinafter, one feature of the present invention resides, briefly stated, in a system and method of conversion of gravitation in the impulse of force which has two rotatable elements, placing one into another and having different masses and forms and are connected to one another, and disconnect from one another by means of a third element, so that during one portion of their free rotation from an initial position around a general axis, they rotate jointly and then, when one of said elements, which also rotates around itself and a third element's axle, separates from another element in a moment when the whole rotatated system reaches its dead-zone the only another element continues same way rotation from dead-zone position due to conversion of gravitation of element, which separates in the impulse of force, which accumulates by another element.

A method of the invention includes the step of moving of such two disconnectable elements over the above two portion of their movement, first jointly, and then by only one element which moves further the same way, while the other element moves in a different way in a moment of separation.

The novel feature of the present invention are set forth in particular in the appended claims.

The invention itself, however, both as to its construction and to its manner of operation, will be best understood from the following description of a preferred embodiment, which is a accompanied by the following drawings.

BRIEF DESCRIPTION OF THE DRAWINGS

FIG. 1a shows a schematic representation of a pulley, which relates to FIG. 1, for determining a displacement of element 14, as a result of impact actions on impulse of force.

FIG. 5 is a system shown in FIG. 1, in a moment of action on bar 14, in its initial upper position, which provides a 45 degree angle of approach of a stationary unbalanced mass to an initial position of movement.

FIG. 5a is a schematic representation of a pulley, shown on FIG. 1a in a moment of impact action, on bar 14 in its initial upper position.

FIG. 6 is a system, shown FIG. 1, in a moment of impact action on bar 14 in its initial lower position, which provides a 30 degree angle of approach of a stationary unbalanced mass to an initial position of movement.

FIG. 6a is a schematic representation of a pulley, shown FIG. 1a, in a moment of impact action on bar 14, in its initial lower position.

DESCRIPTION OF A PREFERRED EMBODIMENT

Figure 1:
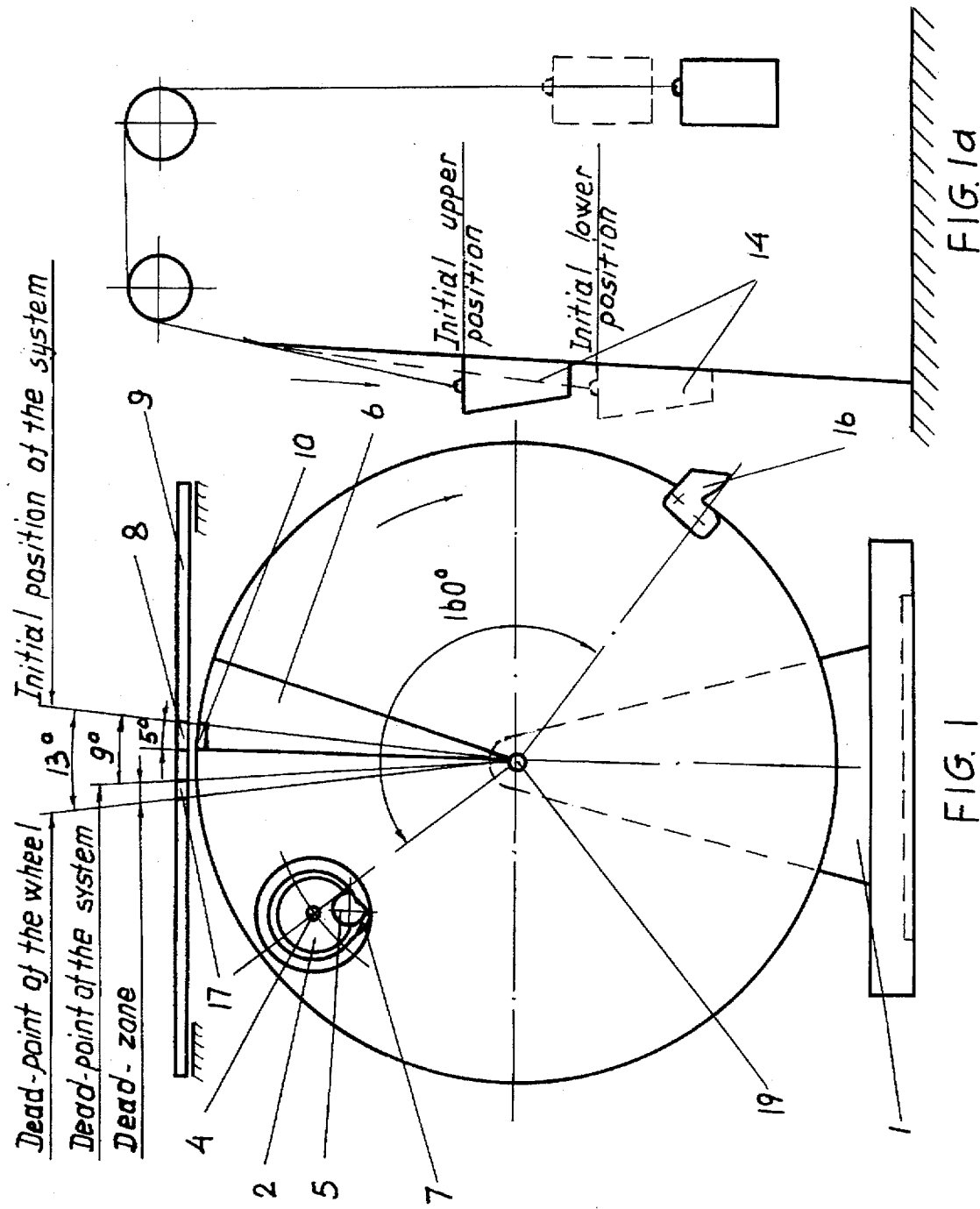
FIG. 1 shows a schematic representation of a system and method of conversion of gravitation in the impulse of force in accordance with the present invention in its initial position for free rotation.

A system for conversion of gravitation in the impulse of force includes a support 1 for a central axle 19, for a wheel 3.

An adapter 2 attached to the wheel 3 by means of a bolt 4 and connecting the wheel 3 with the ball 5.

Figure 3:
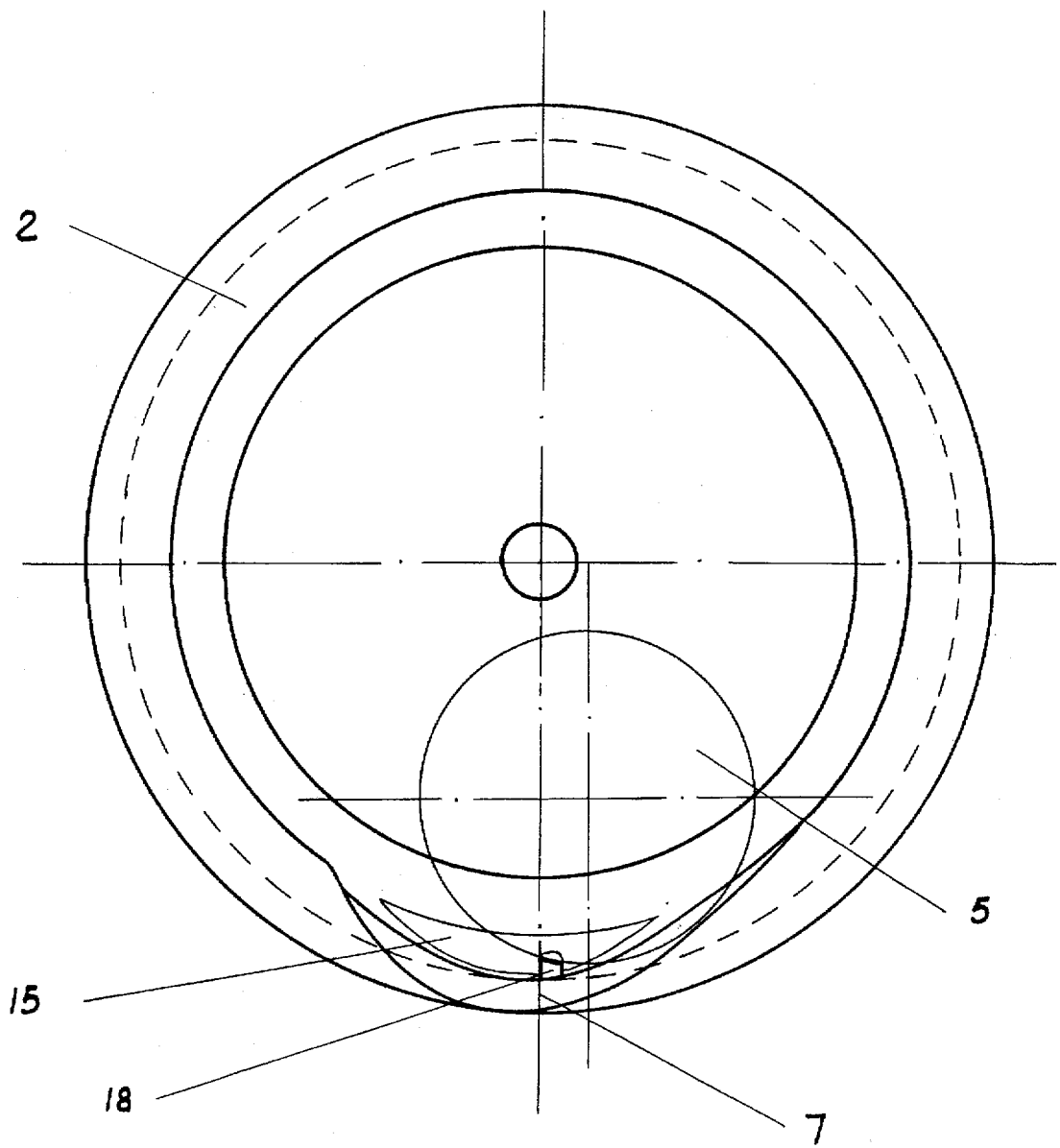
FIG. 3 is the most preferred embodiment of the third element (adapter)

The adapter has a sloped outlet 7 which form should be in accordance with a way of rotation, from an initial position. The adapter, shown in FIG. 3, is able to work smoothly for a clockwise rotation; that's why it has a smooth form of transferring from the middle of the outlet 7 to the right. Any ball is able to keep its motionless state in the initial position due to a ball lock 18.

Practically a ball-lock 18 separates a sloped outlet 7 on two zones: to the right is a zone for input of the ball to the adapter and to the left is a zone, where the ball exits the system. The ball 5 can exit the system at any moment of movement, depending on the location of sloped outlet, which can be adjusted by turning it on its axis (bolt 4). In the process of rotating inside the adapter the ball always locates itself on the bottom of adapter. During the rotation above system, from the initial to the lower position (approx. 175 degrees). System has powered by gravity of unbalanced masses 5 & 6.

During the rotation from the lower position to dead-zone position (approx. 165 degrees) system moves by inertia.

During the rotation from dead-zone position (where the ball exits the system) to the initial position (approx. 20 degrees) system has power by impulse of force, which generated in a moment of separation.

Due to the full inner connection of the wheel 3 and ball 5 through the adapter 2 and the presence of unbalanced masses provide by element 6 (stationary unbalanced mass) and element 5 (movable unbalanced masses), the element 3 and 5 move first jointly over one part of their rotation movement, and then when the element 5 reach a sloped outlet 7, it separates, from the above system and only element 3 continues its rotation.

The four balls, having different dead-weight are alternately included in this experiment as the movable masses. The heaviest of them (first one) used only once to find an initial position of movement by mark 8 on the lath 9 and mark 10 on the wheel 3 to make all other given conditions equal.

Figure 2:
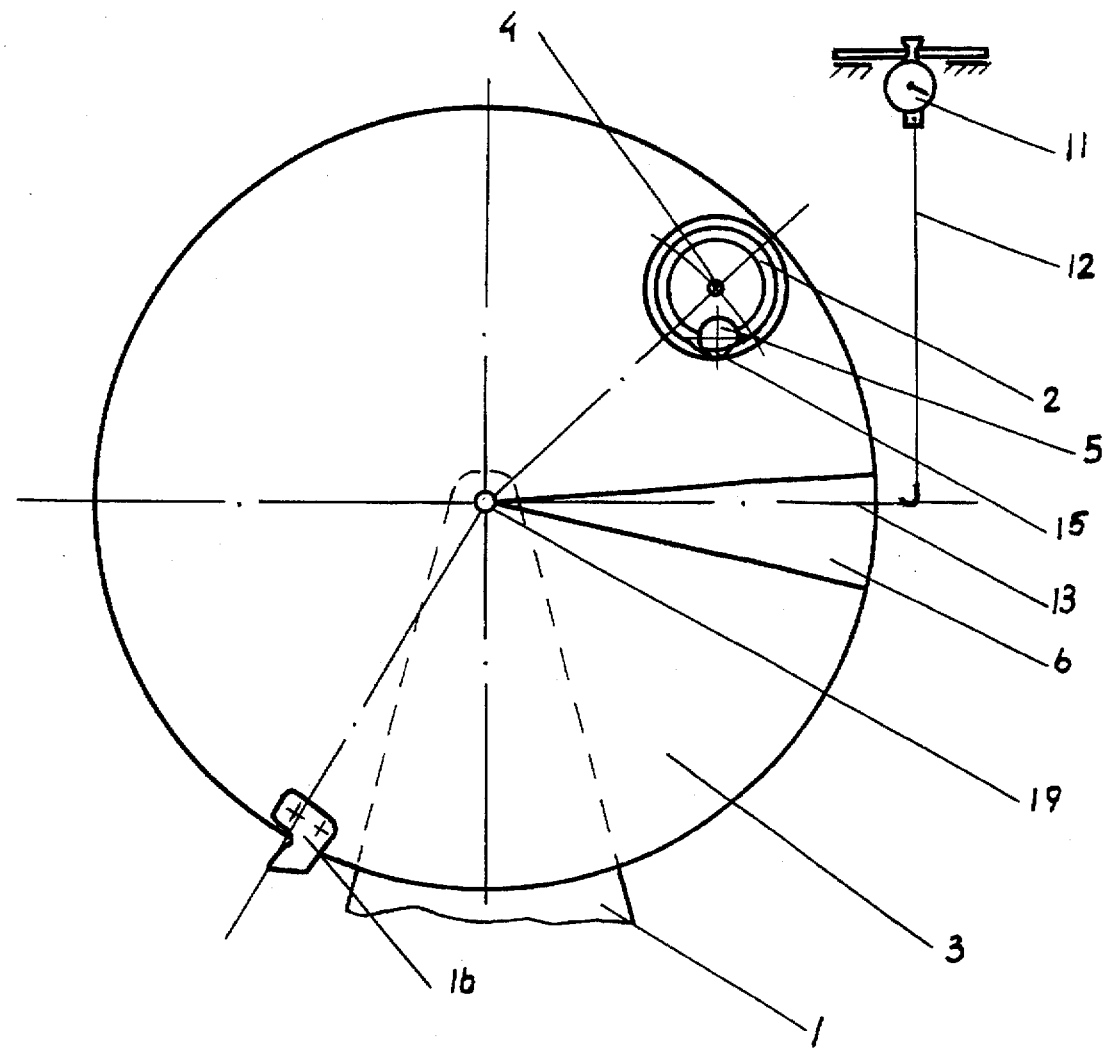
FIG. 2 shows a process of weighing unbalanced masses.

For the same reason all kinds of unbalanced masses have been weighed as shown FIG. 2, using a dial balance 11, a hook 12 and member 13 as an axis of reference.

The results have been grouped in a table 1.

TABLE 1

| Experimental Data | Unbalanced Masses | | | | |
|---|---|---|---|---|---|
| | Stationary | Stationary with ball 1 | Stationary with ball 2 | Stationary with ball 3 | Stationary with ball 4 |
| Weight is accordingly FIG. 2 in grams | 1630 | 1830 | 1780 | 1730 | 1680 |
| Torsion moment in Kgm | 0,48 | 0,55 | 0,53 | 0,52 | 0,50 |

Figure 4:
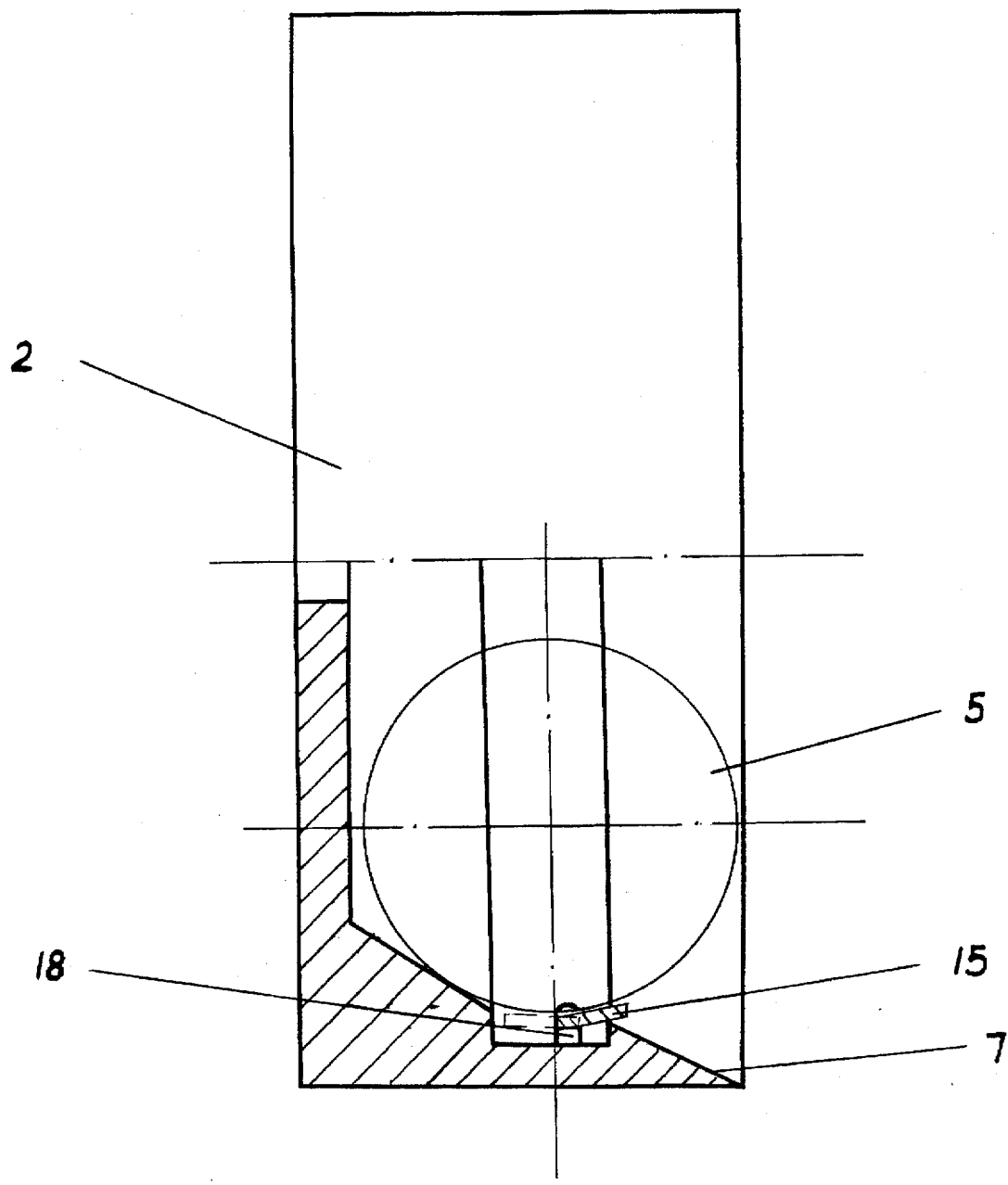
FIG. 4 is a side view of the element shown in FIG. 3

The process of conversion of gravitation in the impulse of force by the above system has been tested in the following ways:

In the first step a dead-zone of movement was determined in the present system by mark 17 (FIG. 1), using ball and an gutter 15 (FIG. 4), which is able to close and open a sloped outlet 7 of adaptor 2. During this step, sloped outlet 7 was closed.

Successively making a turn of adapter 2 with ball inside was determined its position when the separation is occurring at the moment when the whole rotating system reaches its dead-point position.

The dead-zone position is determined by an angle between the dead-point position of the whole system and the dead-point position of the wheel without a ball.

In a second basic step was researched the movement's whole system from an initial position to a dead-zone position alternately with all kinds of balls.

During this step a sloped outlet 7 was opened so that, when the balls reach it, they separated from the above system, which is able to continue to rotate and make certain number of revolutions, depending on the dead-weight of the separate balls.

It is well known that gravitation has been created by masses, so that when the ball 5, as an embodiment of gravitation, separates from wheel 3, its action disappears, but an impulse of force is coming instead of it.

That is why the system, which is powered by gravity during a first half of the revolution and by inertia during almost a second half of the revolution, is able to make the rest of the full mm from the dead-zone position.

In this step, it was also determined that the generated impulse of force after separation the second ball from the whole system in its dead-zone position is sufficient for making by wheel 3 seven revolutions.

Such impulse of force is sufficient for passing an initial position by whole rotated system.

In the third step, the value of displacement of bar 14 in its upper initial position was determined, when the impact action was performed by the joint action of the masses 5 and 6 and an angle of approach to an initial position was 45 degrees. During this step a sloped outlet 7 was closed.

In the fourth step, the value of displacement of the same position (as a value of generate impulse of force) was determined from the impact action of the mass 6 only (a performer is hammer 16) after separation of the balls. During these steps a sloped outlet 7 was opened.

The separation of the balls happens in the same position of movement as non separation for getting the minimum quantity of impulses of force and in a bottom position of movement, for getting the maximum quantity of impulses of force (FIG. 5; FIG. 5a).

The results of above tests are grouped in table 2.

TABLE 2

| Experimental Data | Unbalanced Masses | | | |
|---|---|---|---|---|
| | Stationary | Stationary with ball 2 | Stationary with ball 3 | Stationary with ball 4 |
| Weight is accordingly FIG. 2 in grams | 1630 | 1780 | 1730 | 1680 |
| Value of displacement with non separation (impact action of both masses 5 and 6 together) | 58 | 70 | 64 | 60 |
| Value of displacement after separation (mm) in the same as above position (impact action of only the mass 6) | | 80 | 74 | 70 |
| Value of displacement after separation in the bottom position (mm) of movement (impact action of only mass 6) | | 102 | 86 | 76 |
| Maximum acceration as a value of displacement after separation | | 32 | 22 | 16 |
| Coefficient of increase speed | | 1.3 | 1.2 | 1.1 |

During the 5th and 6th steps the value of displacement of the same bar located in its lower initial position (for getting a 30 degree angle of approach stationary unbalanced mass to initial position) was determined as well as in a 3rd and 4th steps (FIG. 6; FIG. 6a).

The experimental data are grouped in Table 3.

TABLE 3

| Experimental Data | Unbalanced Masses | | | |
|---|---|---|---|---|
| | Stationary | Stationary with ball 2 | Stationary with ball 3 | Stationary with ball 4 |
| Weight is accordingly FIG. 2 in grams | 1630 | 1780 | 1730 | 1680 |
| Value of displacement with non separation (impact action of both masses 5 and 6 together) | 25 | 32 | 28 | 22 |
| Value of displacement after separation (mm) in the same as above position (impact action of only the mass 6) | | 42 | 38 | 32 |
| Value of displacement after separation in the bottom position (mm) of movement (impact action of only mass 6) | | 64 | 50 | 38 |

TABLE 3-continued

| Experimental Data | Unbalanced Masses | | | |
| --- | --- | --- | --- | --- |
| | Stationary | Stationary with ball 2 | Stationary with ball 3 | Stationary with ball 4 |
| Maximum acceration as a value of displacement after separation | | 32 | 22 | 16 |
| Coefficient of increase speed | | 1.3 | 1.2 | 1.1 |

During the 8th step the value of displacement of bar in its upper and lower initial positions from the impact action of only the mass 6 after two revolutions, has been determined when the bar moves to its initial position after one revolution of movement, when the movable mass has separated from the wheel, and the angle of approach stationary unbalanced mass to initial position was 9 degrees (dead-point position).

The experimental data are grouped in table 4.

TABLE 4

| Experimental Data | Unbalanced Masses | |
| --- | --- | --- |
| | Stationary | Stationary with ball2 |
| Weight is accordinly FIG. 2 in grams | 1630 | 1780 |
| Value of displacement of a bar from its upper initial position | 57 | The second ball was separated from the wheel when the angle |
| Value of displacement of a bar from its lower initial position | 32 | of approach stationary unbalanced mass to initial position was 9 degrees |

The invention is not limited to the details shown, since various modifications and structural changes are possible, without departing in any way from the spirit of the invention.

What is desired to be protected by patent Letters is set forth in the appended claims.

I claim:

1. A system for conversion of gravitation in the impulse of force, comprising a first rotatable element;

a second rotatable and element, said second element and first elements are placing one into another and having different masses and forms; and a third element having a to disconnect said second and first rotatable elements from one another at any moment of movement; and so that during one portion of their free rotation from an initial position around a general axis, they rotate jointly and then in a moment when the second of said elements, which also rotates around itself and a third element's axle reaches a sloped outlet on its way and a whole rotated system reaches its dead-zone position at the same moment, said second element separates from said first element which continues the same way rotation, powered by an impulse of force, which generates in a moment of separation as a result of the conversion of gravitation in it.

2. A system as defined in claim 1, wherein a first of said elements is a wheel having stationary unbalanced mass while the second of said elements is a ball.

3. A system as defined in claim 1, wherein a third of said element is an adapter, having a sloped outlet.

4. A method of the conversion of gravitation in the impulse of force, comprising the steps of providing first and second elements having different masses;

rotating said elements; and connecting said elements so that during one portion of the rotation they rotate jointly and then during another portion of the rotation when one of the elements separates from another only the other of the elements continues same way rotation, while the other element moves different way in a moment of separation.

* * * * *